Nov. 17, 1942.　　　　E. E. HEDENE　　　　2,302,370
FLUID OPERATED CHECK VALVE
Filed Dec. 31, 1940　　　　3 Sheets-Sheet 1

INVENTOR
Edwin E. Hedene
BY Lewis D. Konigsford
ATTORNEY

Nov. 17, 1942.　　　E. E. HEDENE　　　2,302,370
FLUID OPERATED CHECK VALVE
Filed Dec. 31, 1940　　　3 Sheets-Sheet 2
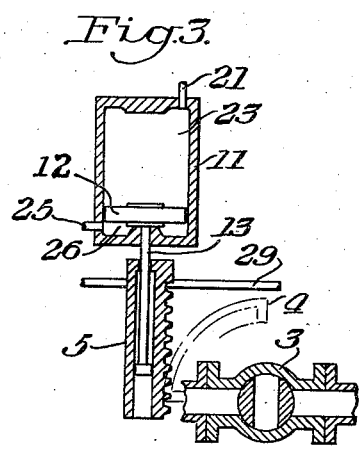
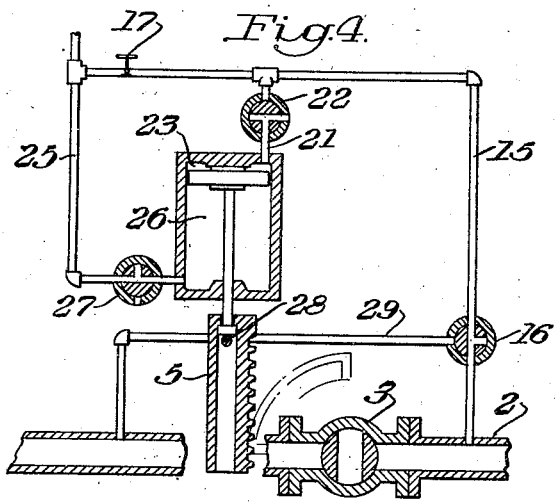
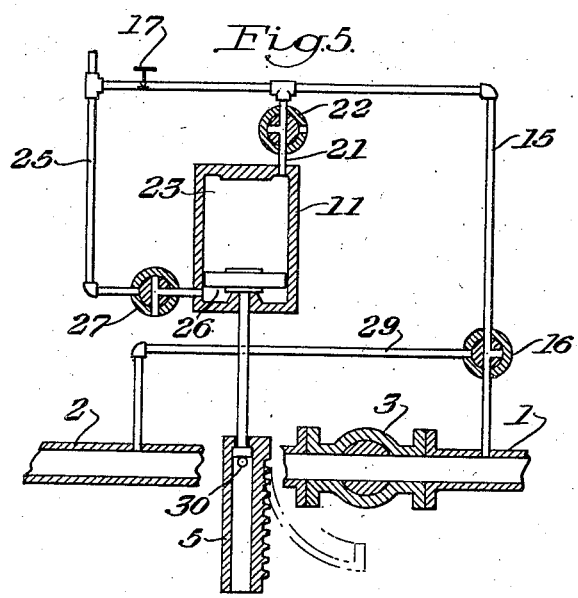
INVENTOR
Edwin E. Hedene.
BY
Lewis D. Konigsford
ATTORNEY Nov. 17, 1942.  E. E. HEDENE  2,302,370
FLUID OPERATED CHECK VALVE
Filed Dec. 31, 1940  3 Sheets-Sheet 3
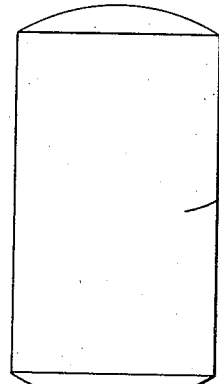
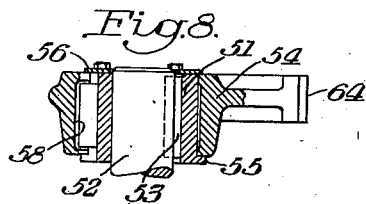
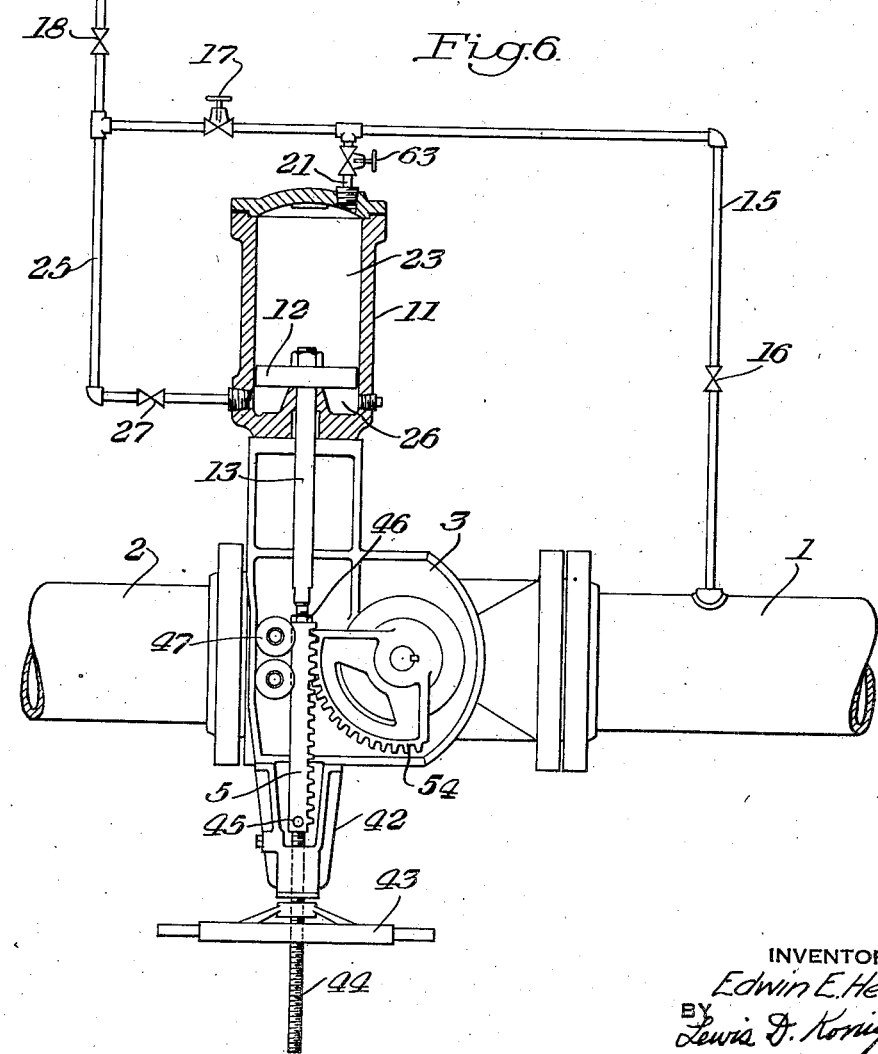
INVENTOR
Edwin E. Hedene.
BY
Lewis D. Konigsford
ATTORNEY Patented Nov. 17, 1942

2,302,370

UNITED STATES PATENT OFFICE 2,302,370

FLUID OPERATED CHECK VALVE

Edwin E. Hedene, Oakland, Calif., assignor to Merco Nordstrom Valve Company, Pittsburgh, Pa., a corporation of Delaware Application December 31, 1940, Serial No. 372,455

4 Claims. (Cl. 137—153)

The present invention relates to fluid operated check valves for use on fluid distribution mains or the like.

In a pipe line employed for transmission of natural gas over long distances, it is desirable to employ automatically operated valves at intervals in the line which will close in event of a break in the line to isolate the broken portion of the line and thus eliminate the danger of explosions or possibility of large losses of gas. It has been proposed to install valves in such lines which are operated by pressure differences in the line. However, the normal flow in such lines is not steady, as it is the general practice to supply gas to the line at a constant rate throughout the day and night period and allow the line pressure to fluctuate in accordance with the demand. It is not desired that these normal surges of pressure which develop in the line should operate the automatic closing valve.

It is an object of this invention to provide a check valve which will be operated automatically to close the line in which it is connected should a sudden drop in pressure occur, such as would be caused by a break, while normal fluctuations in pressure and in rate of flow in the line will not effect operation of the valve.

A further object is the provision of a valve automatically operated by power means to close in event of a break occurring in the line in which the valve is connected, and which will not automatically open the valve when pressure is restored.

Another object is the provision of an automatically operating check valve having manually detachable means for power operation thereof to open or close the valve.

Still another object is the provision of a valve having auxiliary fluid storage means for operating the valve in event of failure of the pressure supply.

Another object is the provision of an automatically operating check valve which will close upon a break occurring in the line upstream or downstream of the valve.

Another object is the provision of an automatically operating check valve which is simple in construction and reliable in operation, and is inexpensive to manufacture.

According to the present invention, I provide automatically operating means for a valve which is responsive to rate of pressure change to close the valve when the rate of pressure change becomes greater than normally encountered in the pipeline, such as would be occasioned by a break in the line. In the preferred embodiment of the invention I employ a valve operated by a piston in a cylinder in which I maintain balanced or substantially balanced pressures on the two sides of the piston through a choke or throttling orifice adjusted so that normal fluctuations in pressure in the pipe line can adjust themselves across the piston by flow through the orifice while abnormally rapid decreases in pressure will cause a sufficient pressure differential across the piston to operate the piston to close the valve. A reservoir may be provided to maintain a sufficient volume of fluid under pressure to secure the desired operation. The valve employed preferably is of the static pressure balanced type, as for example, a rotary plug valve or double seat globe type valve or the like.

The invention will be described in greater detail in the following specification taken in connection with the accompanying drawings, wherein preferred embodiments of the invention are shown by way of illustration, and wherein Figure 1 is a diagrammatic view showing my invention applied to a pipeline in which the valve is in open position.

Figure 3 is a view showing the position of the power piston when pressure is restored.

Figure 4 is a view similar to Figure 2 with a bleeder valve open,

Figure 5 is a view similar to Figure 4 showing an operation of the valve,

Figure 6 shows a further embodiment of the invention,

Figure 7 is a plan view of a detail, and

Figure 8 is a vertical section of Figure 7.

Figure 1:
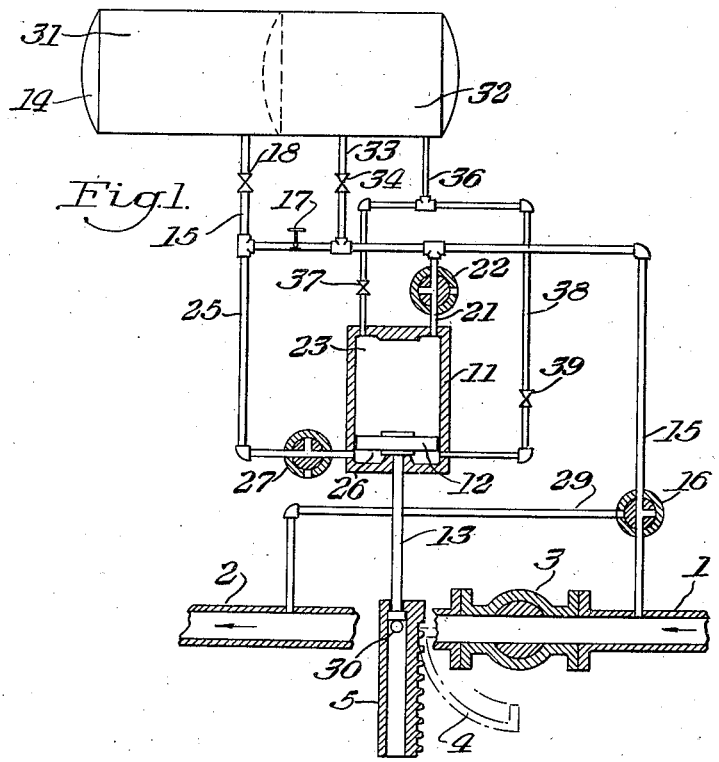

Referring to Figures 1 to 5 of the drawings, wherein the invention is diagrammatically illustrated, there is shown a pipeline comprising an upstream portion 1 and a downstream portion 2 having a valve 3 interposed therein. As shown, this valve preferably is of the rotary plug type and has a gear segment 4 secured to its stem adapted to be operated by a gear rack 5.

A cylinder 11 is suitably supported from the valve casing and has a piston 12 therein connected by a rod 13 to the rack 5. A reservoir 14 is provided which normally is supplied by and is maintained at the same pressure as the pipeline, by means of a conduit 15 having valves 16, 17 and 18 therein. Valves 16 and 18 normally are open and valve 17 may be of a type to serve as a choke valve. A conduit having a valve 22 therein connects conduit 15 with the upper chamber 23 of the cylinder above the piston and a conduit 25 which may have a three-way valve 27 therein, is provided to connect the conduit 15 with the lower chamber 26 of the cylinder below the piston. A conduit 29 may be provided connected at one end to the pipe 2 and at its other end by means of the three-way valve 16 to the conduit 15.

The operation of the apparatus may be described with reference to the diagrammatic views shown in Figures 1 to 5. In Figure 1 the main valve 3 is open so that gas can flow therethrough. Gas flows through the conduit 15 and choke valve 17 into the chamber 31 of reservoir 14 and fills this chamber at the same pressure as the gas in pipe 2. The pressure is also conducted by conduits 21 and 25 to the two chambers 23 and 26 of the cylinder 11 on opposite sides of the piston 12, and as the pressures therein are balanced, the piston 12 is not moved. Should a break occur in the line in the downstream conduit 2 of the valve, the pressure in the pipes 1 and 2 will fall rapidly and the pressure in conduit 15 also will fall. Because of the throttling action of valve 17 the gas in chamber 31 of the reservoir 14 cannot flow through valve 17 into conduit 15 rapidly enough to maintain the pressure in conduit 15 and as chamber 23 is connected thereto, the pressure in chamber 23 also falls. The conduit 25 is connected to conduit 15 on the other side of choke valve 17 and therefore the pressure of the reservoir 31 will be substantially maintained in lower cylinder chamber 26, and the difference in pressure between chambers 26 and 23 will move the piston 12 upwardly and with it the rack 5 to cause the valve 3 to close and shut off the upstream side 1 from the break in the line 2.

Figure 2:
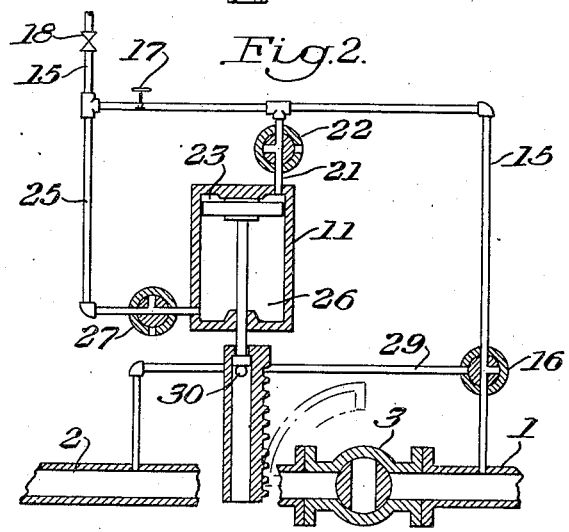
Figure 2 is a view similar to Figure 1 in which the valve is shown in closed position.

The closed position of the valve 3 is shown in Figure 2 with the piston in corresponding position. If the break has occurred on the upstream side, the closing of valve 3 and of the automatic closing valve upstream thereof isolates the pipe section 1, and as the pressure in pipe 1 bleeds off the pressure from chamber 26 will gradually bleed through the valve 17 until the pressure in chambers 23 and 26 become equalized. However, if the break has occurred on the downstream side, the upstream automatic valve remains open and the building up of pressure in the conduit 1 due to closing of valve 3 will bleed back through conduit 15, valve 17 and conduit 25 into chamber 26 more slowly than it can be transmitted by conduits 15 and 21 to chamber 23 so that the pressure in chamber 23 will build up more rapidly than the pressure in chamber 26, which will move the piston 12 downwardly. However, there is no force transmitting connection between piston rod 13 and the rack 5 in this direction so that the valve 3 will remain in closed position, while the piston 12 takes the position shown in Figure 3.

If it is desired to operate the valve 3 by fluid pressure the first step is to turn three-way valve 22 to atmosphere, thus shutting off pressure from conduit 15 to chamber 23 and to bleed the pressure from chamber 23 to atmosphere. This allows the pressure in chamber 26 to move the piston 12 upwardly to the position shown in Figure 4. A pin 28 is then inserted through the hole 30 in the rack so that when the piston rod 13 moves downwardly it will move the rack 5 therewith. The valve 27 now is turned to bleed to atmosphere and to shut off the pressure from conduit 25 to chamber 26 so as to reduce the pressure in chamber 26, and valve 22 is returned to its original position, as shown in Figure 5, to admit pressure to the chamber 23 from the reservoir 31 and conduit 15 and thus move the piston 12 and with it the rack 5 to rotate the valve 3 to open position. The pin 28 then is removed from the rack, valve 27 is returned to its position shown in Figure 1, and the apparatus is ready for automatic operation.

Auxiliary chamber 32 is provided in the reservoir 14 for power operation of the valve when for any reason the pressure in chamber 31 is exhausted. This chamber is connected by a pipe 33 having a check valve 34 therein with the conduit 15, and pipe 36 having a valve 37 therein connects the chamber 32 with the upper chamber 23 of the cylinder 11. The pipes 36 and 38 having a valve 39 therein connect the chamber 32 with the lower chamber 26 of the cylinder 11.

Valves 37 and 39 normally are closed, and storage chamber 32 is thus kept filled with gas as the check valve 34 allows gas to enter chamber 32 but does not allow it to flow out in case of a break or fluctuation in line pressure. If it is desired to operate the piston 12 when there is no other source of pressure available the valve 27 is turned to bleed to atmosphere, thus relieving the pressure in chamber 26, and the valve 37 is opened to allow pressure to enter chamber 23 from the auxiliary reservoir 32. This moves the piston 12 downwardly, and with a pin 28 located in hole 30 of the rack 5, the rack moves with the piston rod to turn the valve 3. If it is desired to move the valve in the opposite direction, valve 37 is closed, valve 27 is retained in its normal position and valve 22 is turned to bleed to the atmosphere, while valve 39 is opened, thus moving the piston 12 upwardly to rotate the valve 3.

Should the break in the main line have occurred on the upstream side 1 and it is desired to introduce pressure into the chamber 31 from the downstream side 2, the valve 16 is turned counterclockwise 90°, thus allowing pressure from the downstream conduit 2 to flow into the reservoir and shutting off the upstream conduit 1 therefrom.

In the modification shown in Figure 6, like parts are indicated by like reference characters. A bracket 42 suitably supported by the valve casing, carries a hand wheel 43 and a threaded rod 44 is secured at one end to rack 5 by a removable pin 45, the rod coacting with hand wheel 43, whereby the valve may be manually operated. Pin 45 is removed when it is desired to operate the valve by the power piston. Rollers 47 may be provided to support the rack 5 in engagement with the gear segment 4, and rod 13 is threaded to rack 5 and locked by a nut 46.

In this modification a one-way drive is used between the gear segment and valve stem to prevent automatic re-opening of the valve. For this purpose a sleeve 51 is keyed to the valve stem 52 by a key 53, this sleeve receiving the hub of a gear segment 54 which is supported by the flange 55 of the hub. A plate 56 held on the stem by cap screws 57 prevents removal of the sleeve or gear segment. Gear segment 54 has a recess 58 in its hub extending for about 90° which receives a key 59 permanently secured in a keyway 60 in the sleeve 51. Thus, as viewed in Figure 7 wherein the valve is shown in closed position, the recess 58 and key 59 would allow counterclockwise movement of the gear 54 without rotating the valve stem. In order to rotate the valve stem the key 61 is inserted in the keyway 62 in the sleeve, thus rigidly securing the gear segment, sleeve and valve stem together, and upon supplying fluid pressure to the proper side of the operating piston the gear 54 is rotated counterclockwise and turns the valve stem 52 therewith to open the valve. It will be understood that while both keys 59 and 61 are in place the valve may be rotated in either direction. The key 61 is removed when the valve reaches open position and the valve is ready for automatic operation. Upon the occurrence of an emergency the piston is moved in the direction to rotate gear segment clockwise and because of the engagement of key 59 with the end of recess 58 the valve will be turned to closed position, but upon reversal of the gear and piston the gear 54 will idle over the key 59 without turning the valve stem.

A choke valve 63 is employed in conduit 21 in this modification to control or regulate the rate of movement of the piston to avoid shock in operation. As a certain differential pressure is necessary to operate the piston, the piston will not be operated by minor fluctuations in pressure or large, rapid fluctuations, but will be actuated only by a sustained pressure drop.

The invention is not limited to the details of construction described, as various modifications may be made without departing from the scope of the invention. Thus, other fluid actuated means may be employed for operating the valve, and other one-way drive means may be employed between the valve and the fluid actuated means. For example, conduits 15 and 25 could be separated by a four-way control valve operated by a piston in a power cylinder which replaces choke valve 17, one end being connected to conduit 15 and the other end connected to the other side of conduit 15. Furthermore, the invention is not limited to gas pressure operated valves, as for example, by providing a pneumatic cushion in the reservoir the valves may be operated by liquid.

While the description of the invention and mode of operation has been explained in connection with a gas pipe line, it will be understood that this is an example only of one of the ways in which the invention may be employed, and that the invention may be employed in general in any installation where closing of the valve is desired upon occurrence of a predetermined rate of pressure change.

Having thus described my invention, what I claim as my invention and desire to secure by United States Letters Patent is:

1. In a fluid distribution system, the combination of a pipeline, a valve interposed in said pipeline, a power cylinder having a piston therein connected to said valve for operating the same, a reservoir for fluid under pressure connected directly to the cylinder on one side of the piston and a connection between the reservoir and the cylinder on the opposite side of the piston, said latter connection including means at all times allowing a restricted flow of gas therethrough, a connection between said latter mentioned connection and said pipeline for supplying fluid to the reservoir, and means including a pin preventing re-operation of the valve upon restoration of the pressure in the pipeline.

2. In a fluid distribution system, the combination of a pipeline, a valve interposed in said pipeline, a power cylinder having a piston therein, a gear rack connected to said valve, a piston rod connected to said piston at one end and having a one-way drive connection with said rack for operating the valve in one direction, a manually removable member for forming a driving connection between the piston and gear rack for opening the valve, a reservoir for fluid under pressure connected directly to the cylinder on one side of the piston and a connection between the reservoir and the cylinder on the opposite side of the piston, said latter connection including means for restricting the flow of gas therethrough, and a connection between the latter mentioned connection and said pipeline for supplying fluid to the reservoir.

3. In a fluid distribution system, the combination of a pipeline, a valve interposed in said pipeline, a power cylinder having a piston therein connected to said valve for operating the same, a reservoir for fluid under pressure connected directly to the cylinder on one side of the piston and a connection between the reservoir and the cylinder on the opposite side of the piston, said latter connection including means for restricting the flow of gas therethrough, a second connection between said latter mentioned connection and said pipeline for supplying fluid to the reservoir, an auxiliary reservoir connected to said second connection, a one-way valve in said latter connection, and connections between the auxiliary reservoir and the ends of the power cylinder.

4. In a fluid distribution system, the combination of a pipeline, a valve in said pipeline, fluid pressure means for operating said valve having fluid inlet and outlet sides, a reservoir for storing fluid under pressure for actuating said operating means, a conduit between the pipeline on one side of the valve and reservoir including a normally open throttle valve therein restricting flow between the pipeline and reservoir, a connection between said first named conduit and one side of said valve operating means on the pipeline side of said throttle valve, and a second conduit between said reservoir side of the first named conduit and the other side of said valve operating means, whereby a rate of change in pressure in the pipeline greater than a balancing flow through said throttle valve actuates the valve operating means to close the valve, and means preventing reopening of said valve.

EDWIN E. HEDENE.